United States Patent [19]

Teumer

[11] Patent Number: 4,508,139
[45] Date of Patent: Apr. 2, 1985

[54] TOP-ENTRY CHECK VALVE

[76] Inventor: Henry E. Teumer, 5308 Woodline Dr. S., Mobile, Ala. 36609

[21] Appl. No.: 605,051

[22] Filed: Apr. 30, 1984

[51] Int. Cl.³ ............................................. F16K 43/00
[52] U.S. Cl. .................... 137/315; 137/454.5; 137/527; 251/298; 251/357; 251/363; 251/364
[58] Field of Search .................. 137/315, 454.2, 454.5, 137/515.7, 527, 527.8; 251/298, 305, 306, 307, 308, 357, 363, 364

[56] References Cited

U.S. PATENT DOCUMENTS

| 326,549 | 9/1885 | D'Este | 137/527 |
|---|---|---|---|
| 2,271,390 | 1/1942 | Dodson | 251/305 |
| 2,419,318 | 4/1947 | Johnson | 251/125 |
| 2,482,198 | 9/1949 | Melichar | 251/125 |
| 2,767,735 | 10/1956 | Darling | 137/527 |
| 2,959,188 | 11/1960 | Kepner | 251/363 |
| 3,058,534 | 10/1962 | Keithahn | 175/318 |
| 3,066,693 | 12/1962 | Taylor | 137/454.2 |
| 3,363,645 | 1/1968 | Miller | 137/527 |
| 3,509,908 | 5/1970 | Latham | 137/527 |
| 3,565,107 | 2/1971 | Bunch | 137/515.7 |
| 3,612,097 | 10/1971 | Prince | 137/527.4 |
| 3,618,893 | 11/1971 | Bois | 251/364 |
| 3,720,228 | 3/1973 | Wheatley | 137/454.2 |
| 3,770,242 | 11/1973 | O'Conner, Jr. | 251/305 |
| 3,817,277 | 6/1974 | Wheatley | 137/515.7 |
| 3,933,173 | 1/1976 | Kajita | 137/527.8 |
| 3,990,471 | 11/1976 | Schützer | 137/527 |
| 4,054,153 | 10/1977 | Guyton | 137/527 |
| 4,061,535 | 12/1977 | Nolan | 176/38 |
| 4,128,111 | 12/1978 | Hannon | 137/515.7 |
| 4,194,722 | 3/1980 | Okerblom | 251/305 |
| 4,201,241 | 5/1980 | Schertler | 137/527 |
| 4,307,747 | 12/1981 | Carpentier | 137/315 |

FOREIGN PATENT DOCUMENTS 2216496 8/1974 France .
1214619 12/1970 United Kingdom .

Primary Examiner—George L. Walton
Attorney, Agent, or Firm—Henry J. Zafian; Janet C. Lentz; Stephen P. Gilbert

[57] ABSTRACT

A check valve having a removable seat portion with integral flapper (valving means) is disclosed. The seat portion can be removed through a port in the valve body without breaking any connection of the valve body to the associated fluid flow lines. The seat portion can comprise two sections that secure between them sealing means (e.g., an O-ring) for creating a fluid tight seal when the valving member of the check valve is closed against the seat portion. A fluid tight seal is created between the valve seat portion and valve body by tapers on the valve seat that cam against corresponding recesses of the valve body to force the valve seat portion against the valve body.

10 Claims, 9 Drawing Figures

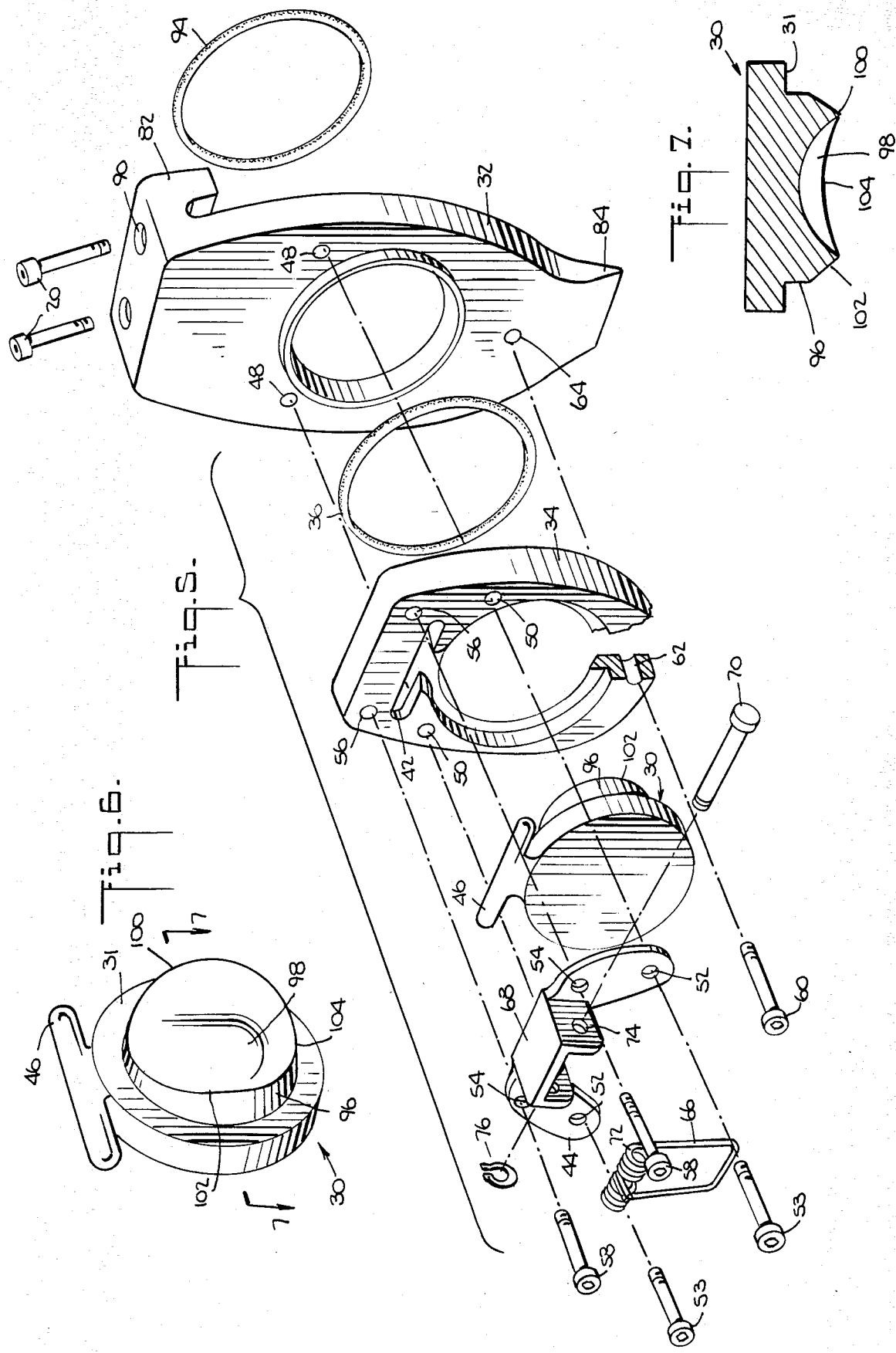

TOP-ENTRY CHECK VALVE

BACKGROUND OF THE INVENTION

The present invention relates to check valves and more particularly to a check valve having a removable seat portion.

Check valves are placed in fluid flow lines to allow the flow of fluids in one direction but block the reverse flow. See, e.g., U.S. Pat. Nos. 2,419,318; 2,482,198; 2,767,735; 3,058,534; 3,066,693; 3,363,645; 3,509,908; 3,565,107; 3,612,097; 3,720,228; 3,817,277; 3,933,173; 3,990,471; 4,061,535; 4,128,111; and 4,201,241; British Pat. No. 1,214,619; and French Pat. Appln. No. 2,216,496.

Some of those documents mention or discuss check valves having removable seats. See, e.g., U.S. Pat. Nos. 3,363,645; 4,128,111; and 4,201,241. Some of those documents mention or discuss means for creating a tight seal between the flapper of the valve and the valve seat when the valve is in the closed position. See, e.g., U.S. Pat. Nos. 3,612,097; 3,817,277; and 4,201,241; and French Pat. Appln. No. 2,216,496. U.S. Pat. No. 3,066,693 refers to a flapper having a recess for reducing the wear and erosion of the flapper. Check valves having valve bodies capable of being opened from the top for removal of the flapper are known.

A continuing problem with check valves, particularly those used with fluids containing abrasive particles, is the time and expense required to smooth (e.g., by grinding) or in some cases to replace the valve seats when replacing the flappers alone will not restore fluid tight seals to the valves. In known valves, at least one connection of each valve to its pipelines must be broken to allow access to the valve seat for such repair or replacement.

SUMMARY OF THE INVENTION

A new top-entry check valve that overcomes these and other problems and affords numerous advantages as compared to known valves has now been developed. Broadly, the present invention relates to a check valve allowing easy and rapid replacement of its valve seat portion and flapper without breaking any connection of its valve body to the associated fluid flow lines, the valve comprising:

a. a valve body having a cavity therein;

b. an entry port in the valve body for allowing access to the cavity of the valve body;

c. a valve seat portion located in the cavity of the valve body and removable through the entry port of the valve body, the valve seat portion having a fluid opening for the flow of fluid therethrough;

d. a valving member (flapper) in operative connection with the valve seat portion and movable between open and closed positions, the valving member and valve seat portion together effecting a substantially fluid tight seal when fluid flowing through the valve body and the fluid opening of the valve seat portion attempts to flow in a backflow (reverse flow) direction; and e. temporary attachment means securing the valve seat portion to the valve body when the attachment means is in a first position, the attachment means being readily accessible through the entry port to allow the attachment means to be moved to a second position so that the valve seat portion is no longer secured to the valve body and can be removed through the entry port without breaking any connection of the valve body to the associated fluid flow lines.

In preferred embodiments, the temporary attachment means are threaded bolts that pass through bores in the valve seat portion and into the valve body to secure the seat portion to the body. In other preferred embodiments, the removable valve seat portion can be split (in a manner described below) to insure proper positioning and proper retention of a means (e.g., an O-ring) for insuring a tight seal between the valving member (flapper) and its seat when the valving member is in the closed position (blocking reverse flow).

Additionally, the top and bottom of the valve seat portion may be provided with tapers that can be accommodated in corresponding recesses in the valve body to aid in creating a fluid tight seal between the valve seat portion and the valve body. The bottom part of that fluid tight seal is formed at about the same time as the top part of the seal, i.e., when the valve seat portion is secured to the valve body. The flapper may be provided with a funnel-shaped raised portion on its upstream side that directs the flow of fluid to reduce wear.

Thus, the present invention provides a check valve whose valve seat and integral flapper can be easily replaced without breaking any connection between the valve body and the respective fluid flow lines. That reduces down-time, increases productivity, and reduces maintenance costs. Other advantages will be apparent to those skilled in the art.

BRIEF DESCRIPTION OF THE DRAWINGS

To facilitate further discussion of the present invention, the following drawings are provided in which:

FIG. 5 is an exploded view of the removable portion of the check valve.

FIG. 6 is a perspective view of the flapper of the check valve looking at the upstream face of the flapper.

FIG. 7 is a view of the flapper taken along line 7—7 of FIG. 6.

DETAILED DESCRIPTION OF THE INVENTION

Figure 1:
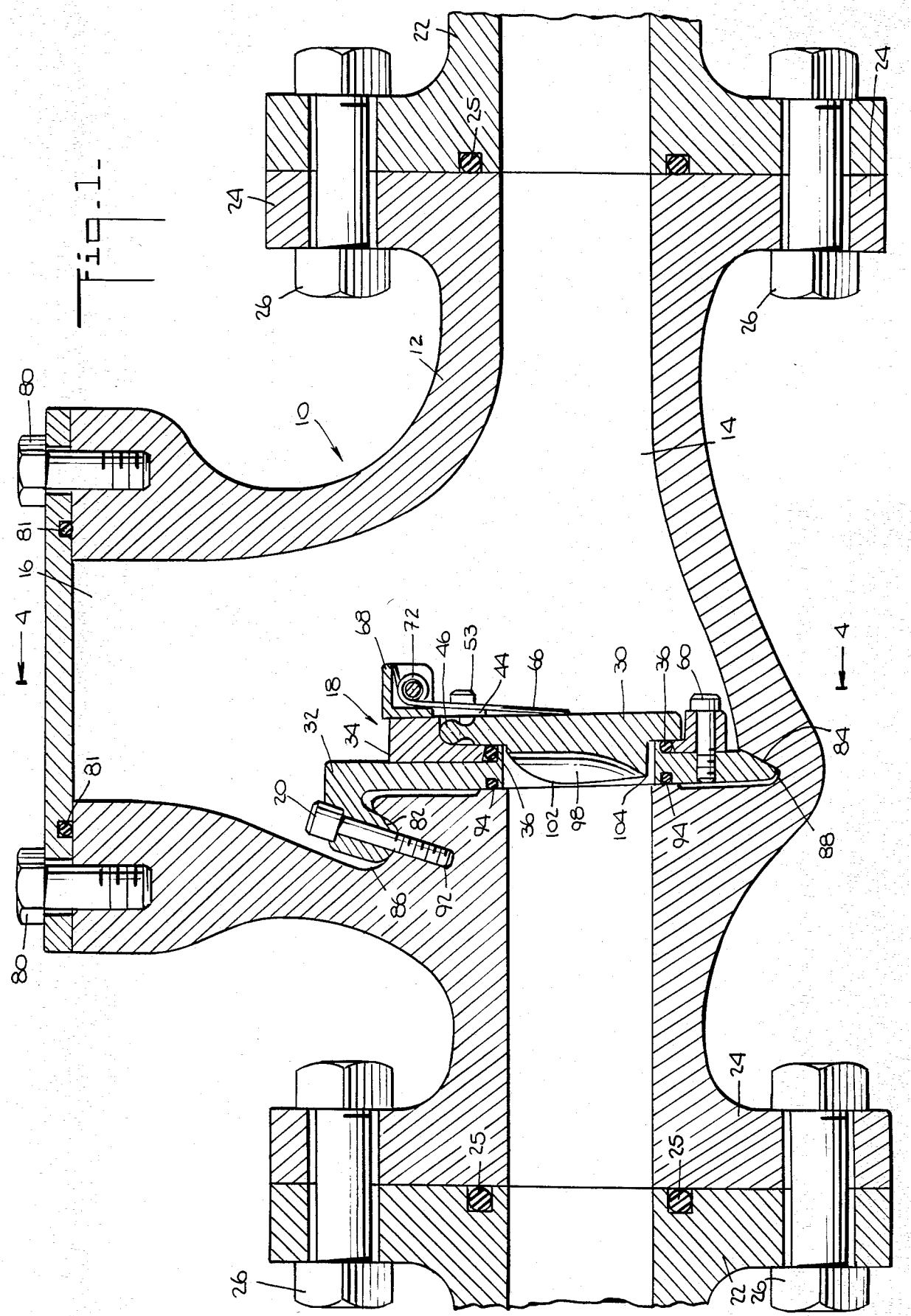
FIG. 1 is a sectional side view of a check valve of the present invention showing the valve located in a fluid flow line and in a closed position (flapper down).

Referring to the drawings, the check valve of the present invention is designated generally by the numeral 10. Check valve 10 comprises valve body 12 having cavity 14 therein and top-entry port 16 for access to removable portion 18. Cavity 14 is dimensioned to accommodate the removable portion 18, which is fastened to the valve body 12 by bolts 20.

Valve body 12 is dimensioned to fit conveniently into existing conventional pipeline 22. Valve body 12 can be provided with any type of conventional piping connections, such as flanges 24 and bolts 26, or the valve can be welded or threaded to the pipeline. O-rings 25 may be placed between the flanges of pipeline 22 and flanges 24 of the valve to assure fluid tight seals. As will be understood by one skilled in the art, all of the O-rings used in the check valve of the present invention may be made of Teflon-type polymers or of other polymers or of metal.

Figure 2:
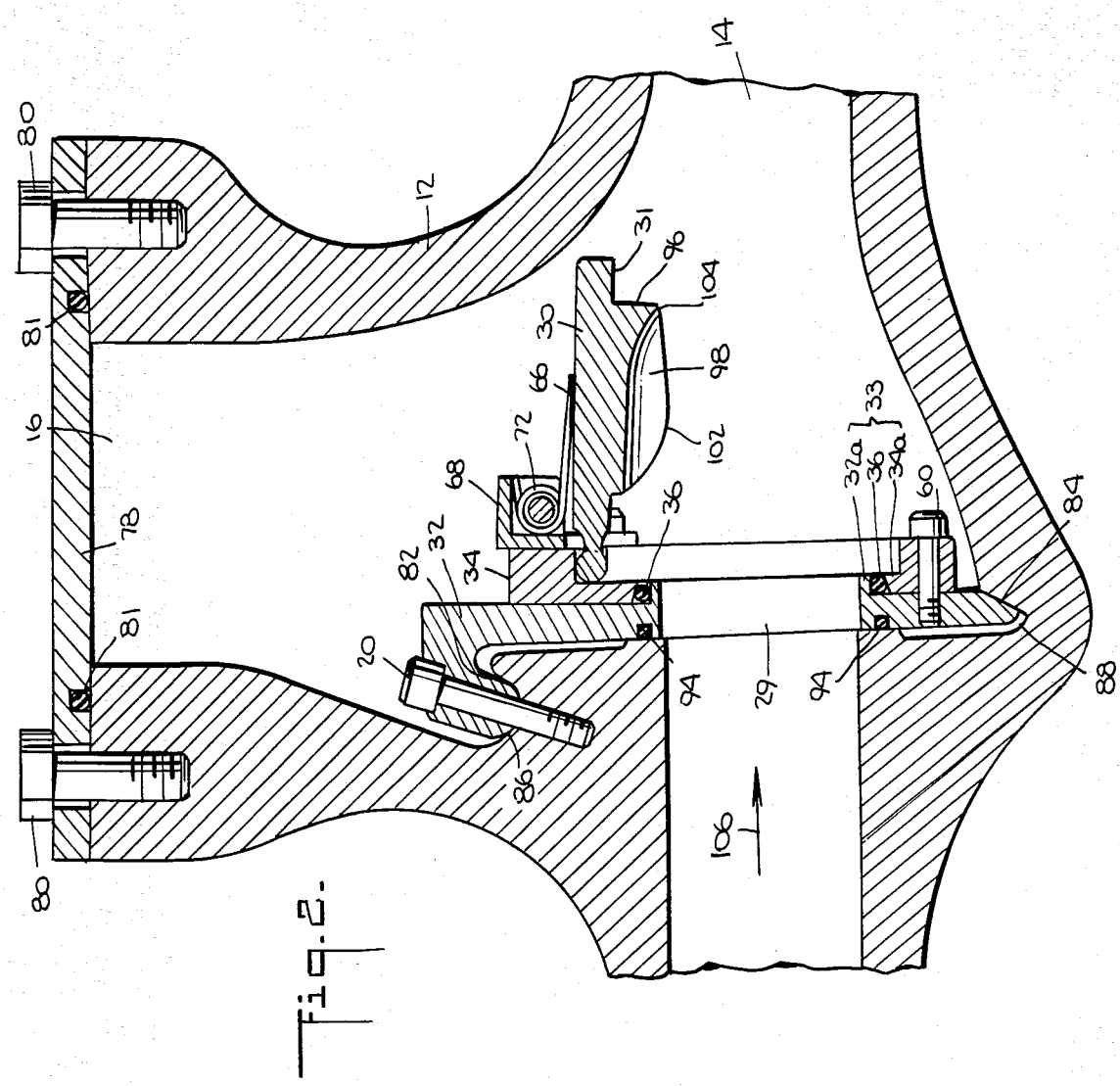
FIG. 2 is a similar sectional side view of the check valve but in an open position (flapper up).

Removable portion 18 comprises split valve seat 28 (comprising seat portions 32 and 34), having a fluid opening 29, and valving member or flapper 30. As seen in FIG. 2, the fluid is allowed to flow through full-bore opening 29 when flapper 30 is in the open position. The normal fluid flow through valve 10 (see arrow 106 in FIG. 2) holds flapper 30 open. Surfaces facing left in FIGS. 1 and 2 face "upstream" and those surfaces facing right in FIGS. 1 and 2 face "downstream."

Figure 8:
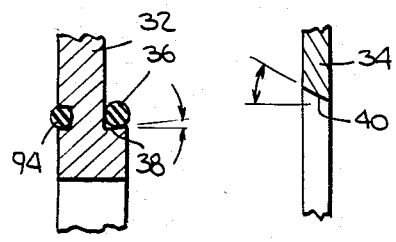
FIG. 8 is an exploded detail view showing the construction of a portion of the split valve seat of the check valve, which construction insures proper positioning and retention of an O-ring.
Figure 9:
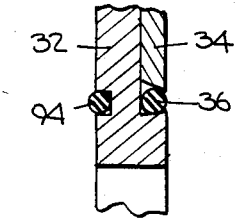
FIG. 9 is a detail view similar to that of FIG. 8 but with the split valve seat portion assembled in its operating configuration.

Seat portions 32 and 34 hold O-ring 36 securely in position when split valve seat 28 is assembled. O-ring 36 is positioned between seat portions 32 and 34 to assure a fluid tight seal between seat surface 33 and closure portion 31 of flapper 30 when flapper 30 is in the closed position. Seat surface 33 surrounds the circumference of fluid opening 29 of split valve seat 28 on the downstream side and, as seen best in FIG. 2, is comprised of O-ring 36 and of inner rims 32a and 34a of seat portions 32 and 34. As shown in FIGS. 8 and 9, seat portions 32 and 34 are angled at 38 and 40, respectively, so that when the two seat portions 32 and 34 are assembled (FIG. 9), O-ring 36 is held securely between them. This assures that O-ring 36 will not become misaligned within or become separated from split valve seat 28 during operation of check valve 10. Those types of failures may occur in some known check valves.

The downstream side of seat portion 34 is provided with recess 42 into which pivot pin 46 of flapper portion 30 is placed (see FIG. 5). Retainer member 44 is placed over pivot pin 46 to hold pin 46 in recess 42. Thus, flapper 30 is free to pivot between open and closed positions during operation.

Corresponding openings (or bores) 48, 50, and 52 on seat portions 32 and 34 and retainer member 44, respectively, align when removable portion 18 is assembled and accommodate threaded bolts 53, which hold retainer member 44 and seat portions 32 and 34 together (bores 48 are threaded and engage bolts 53). Corresponding openings (or bores) 54 and 56 in retainer member 44 and seat portion 34 also align, and threaded bolts 58 hold retainer member 44 securely to seat portion 34 (bores 56 are threaded and engage bolts 58). Bolt 60 is placed through aligned openings (or bores) 62 and 64 of seat portions 34 and 32, respectively, to hold the bottoms of those seat portions together.

Check valve 10 is usually mounted so that gravity tends to help close the flapper. However, valve 10 is biased by closure spring 66 towards closure regardless of the orientation of the valve. Additionally, the pressure caused by any attempted backflow of fluids helps effect proper closure. The closing force exerted by spring 66 must, of course, be less than the usual force of fluid during normal flow, otherwise the valve will not operate as desired.

Figure 3:
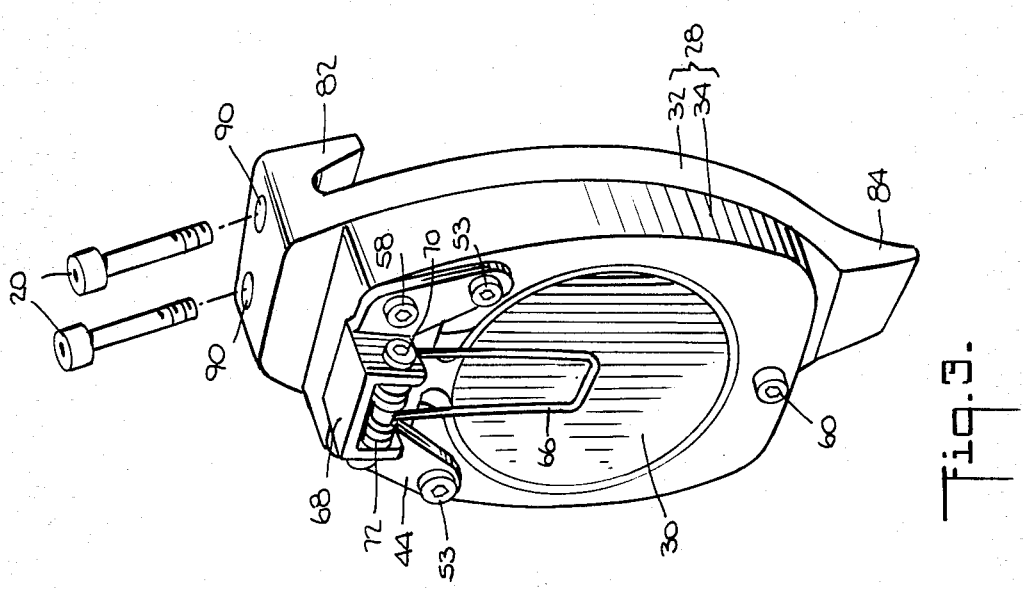
FIG. 3 is a perspective view of the removable portion of the check valve.
Figure 4:
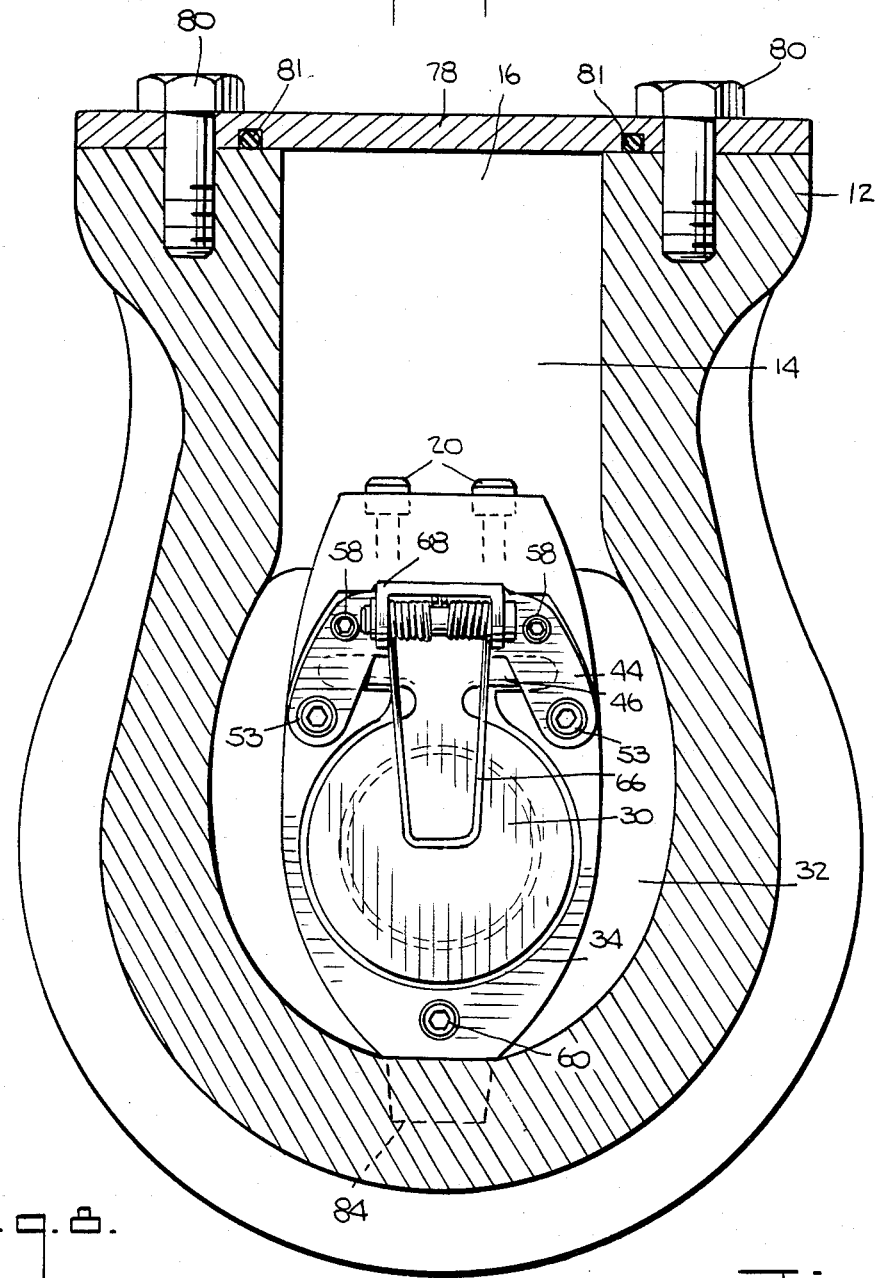
FIG. 4 is a view taken along line 4—4 of FIG. 1.

Closure spring 66 is mounted on bracket 68 or retainer member 44 by inserting bolt 70 through coil portion 72 of closure spring 66 and through holes 74 of bracket 68. Locking ring 76 is placed in a groove at the end of bolt 70 to hold bolt 70 securely in place. Also, the head of bolt 58 at the right in FIGS. 3, 4, and 5 extends far enough out from retainer 44 to block the withdrawal of bolt 70 out of holes 74 during operation.

Removable portion 18 is inserted into and removed from valve body 12 through port 16. Port 16 is closed off by plate 78, which is secured to valve body 12 by bolts 80. O-ring 81 assures a fluid tight seal between the plate 78 and valve body 12.

Seat portion 32 is provided with a top taper 82 and a bottom taper 84, which engage corresponding top and bottom recesses 86 and 88, respectively, of valve body 12. Holes (or bores) 90 of the top of seat portion 32 correspond to and align with threaded holes (or bores) 92 located in top recess 86 of valve body 12. After removable portion 18 has been placed in the valve, bolts 20 are tightened. That forces removable portion 18 downward, thereby camming removable portion 18 counter-clockwise (FIG. 1) about bottom taper 84 by the interaction of tapers 82 and 84 and recesses 86 and 88. That, in turn, forces O-ring 94 against valve body 12 and insures a fluid tight seal between split valve seat 28 and valve body 12.

Flapper 30 has raised portion 96 on its upstream side. Raised portion 96 has a funnel-shaped or concave face 98, which faces upstream when the flapper is closed. Face 98 directs the stream of fluid passing through the valve (which fluid may contain entrained abrasive material) away from annular closure portion 31 of the flapper (FIG. 2) to reduce wear.

The shape of face 98 is shown in FIGS. 6 and 7. Viewed head on, face 98 is circular, with the edges of the circle (except for the top) curving towards the viewer as on three sides of a "U". The "U" is defined by right and left side sections 100 and 102 and bottom section 104. Side sections 100 and 102 are roughly perpendicular to the longitudial axis of pivot pin 46, and bottom section 104 is roughly parallel to that axis.

Other modifications and variations will be apparent to those skilled in the art and the claims are intended to cover all such modifications and variations that fall within the true spirit and scope of the invention.

I claim:

1. A removable valve seat for a check valve that has a pivotably mounted valving member movable between open and closed positions, the check valve comprising a check valve body and a valve seat having a first section and a second section, which sections are separable from one another and from the check valve body but which sections are normally attached to one another and to the check valve body, the check valve body and each section having a bore for the flow of fluid therethrough; a portion of the first section normally being next to a portion of the check valve body, a portion of the second section normally being next to a portion of the first section, a portion of the valving member being rotatably connected to a portion of the second section, and the bores of the check valve body, first section, and second section being aligned when the check valve is in fluid-flow operative condition; the first section having a circumferential lip around the bore, the lip having an outer annular face generally parallel to the axis of the bore; the bore of the second section being of greater diameter than the diameter of the outer annular face of the lip of the first section and having an inner face generally parallel to the axis of the bore; said inner and outer faces of the first and second sections being spaced sufficiently from one another and one or both faces being bevelled to contain and wedge between them sealing means that contacts the valving member when the valving member is in a closed position to effect a fluid-tight seal between the valving member and the valve seat.

2. A check valve allowing easy and rapid replacement of its valve seat portion and flapper without breaking any connection of its valve body to the associated fluid flow lines, the valve comprising:
   a. a valve body having a cavity therein;
   b. an entry port in the valve body for allowing access to the cavity of the valve body;
   c. a valve seat located in the cavity of the valve body and removable through the entry port of the valve body; the valve seat having first sealing means to contact a portion of the valve body, second sealing means to contact a portion of the flapper, and a fluid opening for the flow of fluid therethrough; the valve seat comprising two sections that are separable from one another but which are normally attached to one another, the two sections having corresponding surfaces spaced from one another and configured to wedge between them the second sealing means for facilitating a fluid-tight seal between the flapper and the valve seat when the flapper is in a closed sealing position; the valve seat also having a top taper and a bottom taper and the valve body having two corresponding recesses, the tapers and recesses cooperating to force the first sealing means towards the valve body to create a fluid-tight seal between the valve seat and the valve body when the valve seat is in an operative position in the valve body;
   d. a flapper pivotably secured to the valve seat and movable between open and closed positions, the flapper and valve seat together effecting a substantially fluid-tight seal when fluid flowing in a normal direction through the valve body and the fluid opening of the valve seat attempts to flow in a backflow direction, the flapper having a raised portion, the raised portion having a curved face designed to direct the flow of fluids through the valve to reduce wear;
   e. temporary attachment means for securing the valve seat with the flapper to the valve body when the attachment means is in a first position, the attachment means being readily accessible through the entry port to allow the attachment means to be moved to a second position so that the valve seat with flapper is no longer secured to the valve body and can be removed through the entry port; and
   f. biasing means for urging the flapper towards the closed position.

3. A check valve allowing easy and rapid replacement of its valve seat and valving member without breaking any connection of its valve body to the associated fluid flow lines, the valve comprising:
   a. a valve body having a cavity therein;
   b. an entry port in the valve body for allowing access to the cavity of the valve body;
   c. a valve seat located in the cavity of the valve body and removable through the entry port of the valve body, the valve seat having first sealing means to contact a portion of the valve body, second sealing means to contact a portion of the valving member, and a fluid opening for the flow of fluid therethrough; the valve seat comprising two sections that are separable from one another but which sections are normally attached to one another, the two sections having corresponding surfaces generally parallel to the axis of the fluid opening, the surfaces being spaced from one another and one or both being bevelled to wedge between them at least in part sealing means for facilitating a fluid-tight seal between the valving member and the valve seat when the valving member is in a closed position;
   d. a valving member in operative connection with the valve seat and movable between open and closed positions; and
   e. temporary attachment means securing the valve seat with valving member to the valve body when the attachment means is in a first position, the attachment means being readily accessible through the entry port to allow the attachment means to be moved to a second position so that the valve seat with valving member is no longer secured to the valve body and can be removed through the entry port without breaking any connection of the valve body to the associated fluid flow lines.

4. The check valve of claim 3 further comprising a retainer member, the retainer member pivotably securing the valving member to the valve seat portion.

5. The check valve of claim 3 further comprising a biasing member for urging the valving member towards a closed position.

6. The check valve of claim 3 wherein the valving member has a raised portion on its upstream side, the raised portion having a concave face designed to direct the flow of fluids through the valve to reduce wear.

7. A check valve allowing easy and rapid replacement of its valve seat portion and valving member without breaking any connection of its valve body to the associated fluid flow lines, the valve comprising:
   a. a valve body having a cavity therein;
   b. an entry port in the valve body for allowing access to the cavity of the valve body;
   c. a valve seat located in the cavity of the valve body and removable through the entry port of the valve body, the valve seat having first sealing means to contact a portion of the valve body, second sealing means to contact a portion of the valving member, and a fluid opening for the flow of fluid therethrough; the valve seat having a top taper and a bottom taper and the valve body having two corresponding recesses, each taper and its corresponding recess cooperating to force the first sealing means and valve seat towards the valve body to create a fluid-tight seal between the valve seat and the valve body when the valve seat is in an operative position in the valve body;
   d. a valving member in operative connection with the valve seat and movable between open and closed positions, the valving member, valve seat, and second sealing means together effecting a substantially fluid-tight seal when fluid flowing through the valve body and the fluid opening of the valve seat attempts to flow in a backflow direction; and
   e. temporary attachment means securing the valve seat with valving member to the valve body when the attachment means is in a first position, the attachment means being readily accessible through the entry port to allow the attachment means to be moved to a second position so that the valve seat portion with valving member is no longer secured to the valve body and can be removed through the entry port without breaking any connection of the valve body to the associated fluid flow lines.

8. The check valve of claim 7 further comprising a retainer member pivotably securing the valving member to the valve seat.

9. The check valve of claim 7 further comprising a biasing member for urging the valving member towards a closed sealing position.

10. The check valve of claim 7 wherein the valving member has a raised portion on its upstream side, the raised portion having a concave face designed to direct the flow of fluids through the valve to reduce wear.

* * * * *